US010938775B2

(12) United States Patent
Albrecht

(10) Patent No.: US 10,938,775 B2
(45) Date of Patent: Mar. 2, 2021

(54) CONFIGURATION DATA DISTRIBUTION UNIT AND METHOD FOR CONFIGURING COMMUNICATION DEVICES IN AN INDUSTRIAL AUTOMATION SYSTEM

(71) Applicant: Siemens Aktiengesellschaft, Munich (DE)

(72) Inventor: Harald Albrecht, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/098,677

(22) PCT Filed: Apr. 19, 2017

(86) PCT No.: PCT/EP2017/059254
§ 371 (c)(1),
(2) Date: Nov. 2, 2018

(87) PCT Pub. No.: WO2017/190954
PCT Pub. Date: Nov. 9, 2017

(65) Prior Publication Data
US 2019/0149509 A1    May 16, 2019

(30) Foreign Application Priority Data

May 4, 2016    (EP) .................................... 16168342

(51) Int. Cl.
*G06F 15/173*    (2006.01)
*H04L 29/12*    (2006.01)
*H04L 29/08*    (2006.01)

(52) U.S. Cl.
CPC ...... *H04L 61/2015* (2013.01); *H04L 61/1511* (2013.01); *H04L 61/6059* (2013.01);
(Continued)

(58) Field of Classification Search
CPC ............ H04L 61/2015; H04L 61/1511; H04L 61/6059; H04L 61/6068; H04L 61/2038; H04L 67/12
(Continued)

(56) References Cited

U.S. PATENT DOCUMENTS 8,681,695 B1 *  3/2014  Krishnan ............ H04L 61/2015
                                                      370/328
10,075,441 B2 *  9/2018  Ye ...................... H04L 61/6059
(Continued)

FOREIGN PATENT DOCUMENTS

CN          103384282       11/2013
CN          104782105        7/2015
(Continued)

OTHER PUBLICATIONS

Troan R Droms Cisco Systems O: "IPv6 Prefix Options for Dynamica Host Configuration Protocol (DHCP) version 6; rfc3633.txt", IETF, 1. Dec. 2003.
(Continued)

*Primary Examiner* — Thuong Nguyen
(74) *Attorney, Agent, or Firm* — Cozen O'Connor

(57) ABSTRACT

A configuration data distributing unit that stores an assignment of a first communication device to an address configuration server upon receiving an address configuration request from the first communication device of an industrial automation system, the assignment having a specifiable validity period, and forwards all configuration requests of the first communication device to the address configuration server during the validity period using the stored assignment, whereas the configuration data distributing unit stores an assignment of a second communication device to a prefix configuration server upon receiving a prefix delegation request of the second communication device with a router (Continued)

function, the assignment having a specifiable validity period, and forwards all configuration requests of the second communication device to the prefix configuration server during the validity period using the stored assignment.

9 Claims, 2 Drawing Sheets

(52) U.S. Cl.
CPC .......... *H04L 61/6068* (2013.01); *H04L 67/12* (2013.01); *H04L 61/2038* (2013.01)

(58) Field of Classification Search
USPC ........ 709/223, 217, 245; 370/254, 225, 328, 370/329
See application file for complete search history.

(56) References Cited

U.S. PATENT DOCUMENTS

| | | | | |
|---|---|---|---|---|
| 2010/0191875 | A1* | 7/2010 | Beyer | H04L 63/20 710/30 |
| 2010/0202321 | A1* | 8/2010 | Dec | H04L 29/12915 370/254 |
| 2011/0264778 | A1* | 10/2011 | McGregor | G06F 9/5016 709/223 |
| 2012/0131373 | A1* | 5/2012 | Rohle | G05B 19/0423 713/400 |
| 2013/0086244 | A1* | 4/2013 | Besold | H04L 67/12 709/223 |
| 2014/0215091 | A1 | 7/2014 | Singh et al. | |
| 2014/0355541 | A1* | 12/2014 | Liu | H04W 76/10 370/329 |
| 2015/0312096 | A1 | 10/2015 | Albrecht | |
| 2016/0241511 | A1* | 8/2016 | Albrecht | H04L 43/08 |
| 2016/0380963 | A1* | 12/2016 | Wang | H04L 69/167 709/245 |
| 2017/0012873 | A1* | 1/2017 | Berg | H04L 45/741 |
| 2017/0093970 | A1* | 3/2017 | El-Charif | H04L 41/5054 |
| 2018/0097773 | A1* | 4/2018 | Fu | H04L 61/2015 |
| 2018/0159798 | A1* | 6/2018 | Tomiyama | H04L 67/2804 |
| 2019/0149509 | A1* | 5/2019 | Albrecht | H04L 61/2015 709/223 |

FOREIGN PATENT DOCUMENTS

| | | | | |
|---|---|---|---|---|
| CN | 105094078 | | 11/2015 | |
| EP | 2940926 | | 4/2014 | |
| EP | 2975827 | | 7/2014 | |
| WO | WO-2012139283 | A1 * | 10/2012 | ......... H01L 61/2015 |

OTHER PUBLICATIONS

Droms R et al.: Dynamic Host Configuration Protocol for IPv6 (DHCPv6); rfc3315.txt, IETF, 1. Jul. 2003.
PCT International Search Report and Written Opinion of International Searching Authority dated Aug. 3, 2017 corresponding to PCT International Application No. PCT/EP2017/059254 filed Apr. 19, 2017.
Troan et al., Issues and Recommendations with Multiple Stateful DHCPv6 Options, Internet Engineering Task Force, 2015.

* cited by examiner

CONFIGURATION DATA DISTRIBUTION UNIT AND METHOD FOR CONFIGURING COMMUNICATION DEVICES IN AN INDUSTRIAL AUTOMATION SYSTEM

CROSS-REFERENCE TO RELATED APPLICATIONS

This is a U.S. national stage of application No. PCT/EP2017/059254 filed Apr. 19, 2017. Priority is claimed on EP Application No. 16168342 filed May 4, 2016, the content of which is incorporated herein by reference in its entirety.

BACKGROUND OF THE INVENTION

1. Field of the Invention

The present invention relates to industrial automation systems and, more particularly, to a configuration data distribution unit and method for configuring communication devices in an industrial automation system.

2. Description of the Related Art

In distributed industrial automation systems, it is necessary to ensure during capture, evaluation and transmission of measurement and control data that complete and unaltered data are available in real time, in particular in the case of time-critical industrial production processes. Alterations that are intentional, unintentional or caused by a technical error need to be prevented.

Usually, an industrial automation system comprises a multiplicity of industrial automation devices that are networked to one another via an industrial communication network and are used during production or process automation for controlling or regulating installations, machines and devices. Owing to time-critical constraints in technical systems automated via industrial automation devices, realtime communication protocols, such as PROFINET, PROFIBUS or realtime Ethernet, are predominantly used for communication between automation devices in industrial communication networks.

Interruptions in communication connections between computer units of an industrial automation system or industrial automation devices are extremely problematic, because they can lead not only to a loss of information but also to undesirable or unnecessary repetition of a transmission of a service request, for example. This causes an additional workload for communication connections in the industrial automation system, which can lead to further system disturbances or system faults. Furthermore, untransmitted messages or incompletely transmitted messages can prevent an industrial automation system from changing to or remaining in a safe operating state, for example. In the worst case, failure of a complete production installation and costly production stoppage can occur. A particular problem in industrial automation systems regularly results from signaling traffic with a comparatively large number of, but relatively short, messages, which intensifies the above problems.

EP 2 940 926 A1 discloses a configuration unit of a communication device that configures the communication device by transmitting a datagram with a configuration request to a configuration server. The configuration server responds to the configuration request by assigning the communication device at least one first topological device name element associated with a physical or hierarchic arrangement of the configuration server. Each forwarding distribution unit adds a further topological device name element associated with a physical or hierarchic arrangement of the respective forwarding distribution unit. The configuration unit of the communication device generates the device name of the latter from the topological device name elements and a name element that is explicit within its subnetwork.

EP 2 975 827 A1 explains that communication devices are configured by virtue of first configuration information for the communication devices being transmitted by at least one router within a subnetwork to communication devices that the respective subnetwork comprises via router notification messages. The first configuration information comprises control information with statements about second configuration information provided by at least one configuration server. Communication device or router diagnosis units are used to check whether the first configuration information comprises mutually consistent control information within the respective subnetwork. If there is inconsistent control information, the communication devices are configured in accordance with first configuration information transmitted by at least one router influencing configuration before the inconsistent control information was present.

Internet Engineering Task Force (IETF) draft standard RFC 7550 describes problems that occur in the event of combined use of state-oriented options for Dynamic Host Configuration Protocol for Internet Protocol Version 6 (DHCPv6). Originally, only the options IA_NA for non-temporary addresses and IA_TA for temporary addresses were defined. In practical applications on edge routers, in particular a combined use of the IA_NA option and the IA_PD option for prefix delegation has proved problematic. There are known methods for solving this problem, however. These conventional methods nevertheless have proved inadequate.

SUMMARY OF THE INVENTION

In view of the foregoing, it is an object of the present invention to provide a method for substantially automatic configuration of different communication devices, in particular terminals without a router function, on the one hand, and routers, on the other hand, within an industrial automation system and to provide a suitable apparatus for performing the method.

This and other objects and advantages are achieved in accordance with the invention by a method and configuration data distribution unit for an industrial automation system, wherewith the method in accordance with the invention for configuring communication devices in an industrial automation system, a first DHCPv6 configuration server responds to first configuration requests by providing a respective IPv6 address configuration to a communication device to be configured. By contrast, a second DHCPv6 configuration server responds to second configuration requests by enabling at least one respective IPv6 prefix disseminable via router notification messages for a communication device to be configured that has a router function. The first configuration requests are DHCPv6 configuration requests having an IA_NA (Non-Temp Addresses) option for providing a non-temporary IPv6 address or having an IA_TA (Temporary Addresses) option for providing a temporary IPv6 address, while the second configuration requests are DHCPv6 configuration requests having an IA_PD (Delegated Prefixes) option for a prefix delegation.

In accordance with the invention, a configuration data distribution unit associated with the industrial automation system, on receiving a first DHCPv6 configuration request, comprising an IA_NA or IA_TA option, from a first communication device in the industrial automation system, stores an association between the first communication device and the first DHCPv6 configuration server for a prescribable validity period and takes the stored association as a basis for forwarding, during the validity period, all of the DHCPv6 configuration requests from the first communication device to the first DHCPv6 configuration server. Furthermore, the configuration data distribution unit, on receiving a second DHCPv6 configuration request, comprising an IA_PD option, from a second communication device, associated with the industrial automation system, having a router function, stores an association between the second communication device and the second DHCPv6 configuration server for a prescribable validity period and takes the stored association as a basis for forwarding, during the validity period, all of the DHCPv6 configuration requests from the second communication device to the second DHCPv6 configuration server. In this manner, automatic configuration of both terminals and routers is possible in an industrial communication network on the basis of DHCPv6 while retaining separate operative responsibilities for terminal configuration and for router configuration.

In accordance with a preferred embodiment of the present invention, the configuration data distribution unit responds to a DHCPv6 configuration request from a communication device by storing an association of this communication device with both DHCPv6 configuration servers if this DHCPv6 configuration request comprises both an IA_NA or IA_TA option and an IA_PD option. Accordingly, all of the DHCPv6 configuration requests from this communication device are forwarded to both DHCP configuration servers during the prescribable validity period. The validity period for the association between a communication device and a DHCPv6 configuration server is preferably prescribed by configuration.

In accordance with an advantageous embodiment of the present invention, the configuration data distribution unit, after expiry of the prescribable validity period for the association between a communication device and a DHCPv6 configuration server, takes a DHCPv6 configuration request received after expiry of the validity period as a basis for ascertaining and storing an updated association between the respective communication device and the respective DHCPv6 configuration server. Preferably, the configuration data distribution unit erases an association between a communication device and a configuration server if the configuration data distribution unit receives a DHCPv6 RELEASE message from this communication device. Furthermore, the configuration data distribution unit, in accordance with a further advantageous embodiment of the present invention, erases an association between the second communication device having the router function and the second configuration server if a lease period for an IPv6 prefix enabled for the second communication device by the second configuration server has expired.

An association between a communication device and a configuration server can be formed, by way of example, by an association between a device identifier of the respective communication device and an IPv6 address or a Domain Name System (DNS) name of the respective configuration server. In this case, the device identifier may in particular be a DHCP unique identifier.

The first DHCPv6 configuration server preferably stores information about IPv6 address configurations allocated to communication devices for management of IPv6 address configurations within the context of stateful address configuration. Furthermore, the configuration data distribution unit may be integrated in the second DHCPv6 configuration server, for example, and explicit forwarding of second DHCPv6 configuration requests associated with the industrial automation system can be dispensed with.

The configuration data distribution unit in accordance with the invention for an industrial automation system is provided and suitable for performing a method in accordance with the explanations above. In this case, the configuration data distribution unit includes a processor and memory and is configured so as, upon receiving a first DHCPv6 configuration request, comprising an IA_NA or IA_TA option, from a first communication device associated with the industrial automation system, to store an association between the first communication device and a first DHCPv6 configuration server for a prescribable validity period and to take the stored association as a basis for forwarding, during the validity period, all of the DHCPv6 configuration requests from the first communication device to the first DHCPv6 configuration server. The first DHCPv6 configuration server is in this case provided for providing an IPv6 address configuration to a communication device to be configured.

Furthermore, the configuration data distribution unit is configured, in accordance with the invention, so as, upon receiving a second DHCPv6 configuration request, comprising an IA_PD option, from a second communication device, associated with the industrial automation system, having a router function, to store an association between the second communication device and a second DHCPv6 configuration server for a prescribable validity period and to take the stored association as a basis for forwarding, during the validity period, all of the DHCPv6 configuration requests from the second communication device to the second DHCPv6 configuration server. In this case, the second DHCPv6 configuration server is provided for enabling at least one IPv6 prefix for dissemination by means of router notification messages by a communication device to be configured that has a router function.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
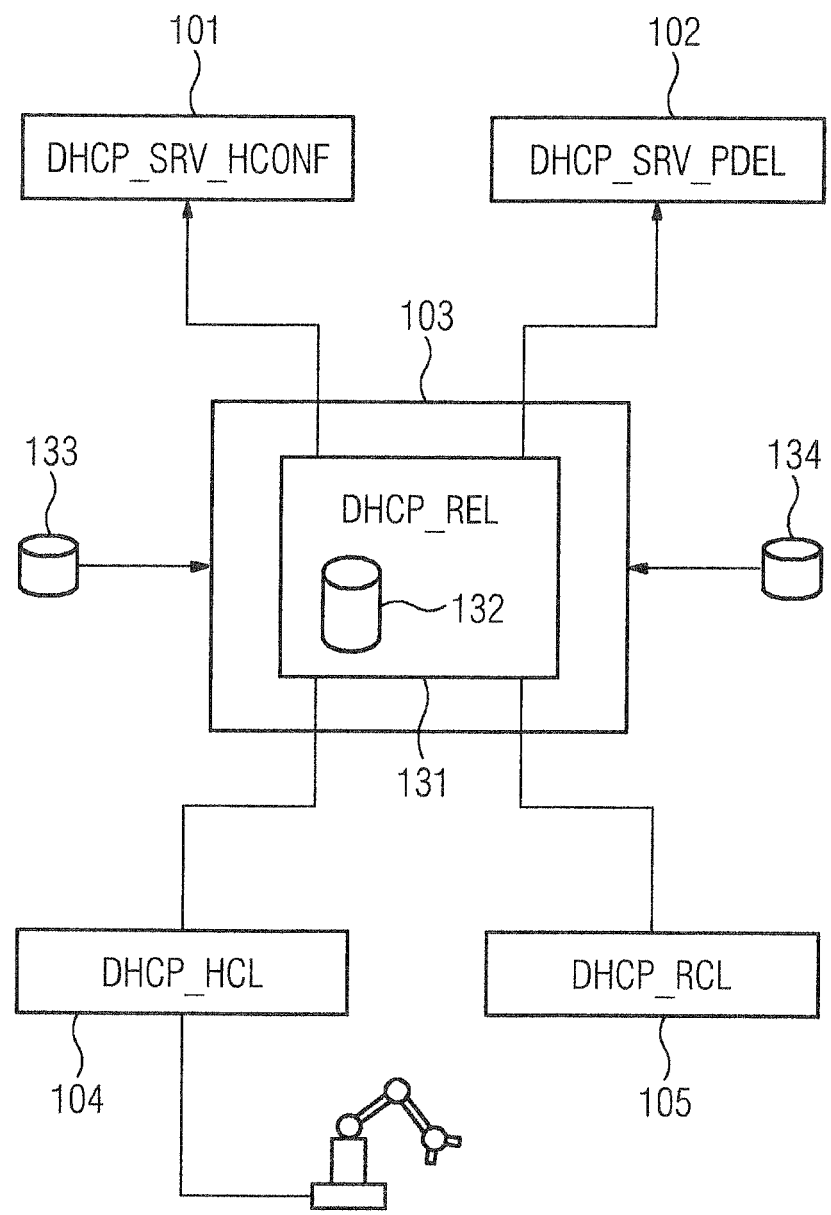
FIG. 1 shows a schematic depiction of an industrial automation system having two DHCPv6 servers, a DHCPv6 relay and a plurality of automation devices to be configured that have DHCPv6 clients in accordance with the invention.

The industrial automation system depicted in FIG. 1 comprises a first 101 and a second 102 DHCPv6 server as configuration server, a router 103 having an integrated DHCPv6 relay 131 as a configuration data distribution unit, a lower-level router 105 having an integrated DHCPv6 prefix client and a communication or automation device 104 without a router function. In the present exemplary embodiment, the automation device 104 is a programmable logic controller of a complex machine and comprises a communication module having a DHCPv6 client, a central unit and an input/output unit. The input/output unit is used for exchanging control and measurement variables between the automation device 104 and a machine or apparatus controlled by the automation device 104. The central unit is particularly provided for ascertaining suitable control variables from captured measured variables. The above components of the automation device 104 are connected to one another via a backplane bus system in the present exemplary embodiment.

The first DHCPv6 server 101 responds to first configuration requests by providing a respective IPv6 address configuration to a first communication device to be configured. Such a first communication device to be configured is the automation device 104, for example. Furthermore, the first DHCPv6 server 101, in the course of stateful address configuration, stores information about IPv6 address configurations allocated to first communication devices. By contrast, the second DHCPv6 server 102 responds to second configuration requests by enabling at least one respective Ipv6 prefix disseminable via router notification messages or router advertisements for a second communication device to be configured that has a router function. Such a second communication device to be configured having a router function is the lower-level router 105, for example.

The DHCPv6 relay 131 is configured so as, upon receiving a first configuration request from a first communication device associated with the industrial automation system, to store an association having a prescribable validity period between the first communication device and the first DHCPv6 server 101 in a table 132 for DHCPv6 client associations. Based on this stored association, the DHCPv6 relay 131 forwards, during this validity period, all of the configuration requests from the first communication device to the first DHCPv6 server. The first configuration requests are DHCPv6 configuration requests or INFORMATION-REQUEST messages or SOLICIT messages having an IA_NA option for providing a non-temporary IPv6 address or having an IA_TA option for providing a temporary IPv6 address. When the automation device 104 makes such a first configuration request, the DHCPv6 relay 131 uses its table 132 for DHCPv6 client associations to store a DHCP unique identifier for the automation device 104 and an IPv6 address 133 for the first DHCPv6 server 101.

Moreover, the DHCPv6 relay 131 is configured so as, upon receiving a second configuration request from a second communication device, associated with the industrial automation system, having a router function, to store an association having a prescribable validity period between the second communication device and the second DHCPv6 server 102 in its table 132 for DHCPv6 client associations. Based on this stored association, the DHCPv6 relay 131 forwards, during this validity period, all of the configuration requests from the second communication device to the second DHCPv6 server 102. The second configuration requests are DHCPv6 configuration requests or INFORMATION-REQUEST messages or SOLICIT messages having an IA_PD option for a prefix delegation. When the lower-level router 105 makes such a second configuration request, the DHCPv6 relay 131 uses its table 132 for DHCPv6 client associations to store a DHCP unique identifier for the lower-level router 105 and an IPv6 address 134 for the second DHCPv6 server 102.

Preferably, the DHCPv6 relay 131 responds to a DHCPv6 configuration request from a communication device by storing an association of this communication device with both DHCPv6 configuration servers 101, 102 if this DHCPv6 configuration request comprises both an IA_NA or IA_TA option and an IA_PD option. Accordingly, all of the DHCPv6 configuration requests from this communication device are forwarded to both DHCP configuration servers 101, 102 during the prescribable validity period. The validity period for the association between a communication device and a DHCPv6 configuration server can be prescribed by configuration, for example.

After expiry of a validity period for an association between a communication device and a DHCPv6 server, the DHCPv6 relay 131 takes a configuration request received after expiry of a validity period as a basis for ascertaining and storing an updated association between the respective communication device and a configuration server to be associated. Furthermore, the DHCPv6 relay 131 preferably erases an association between a communication device and a configuration server if the DHCPv6 relay 131 receives a DHCPv6 RELEASE message from this communication device. In addition, the DHCPv6 relay 131 advantageously erases an association between a second communication device having a router function and the second DHCPv6 server 102 if a lease period for an IPv6 prefix enabled for the second communication device by the second DHCPv6 server has expired.

Figure 2:
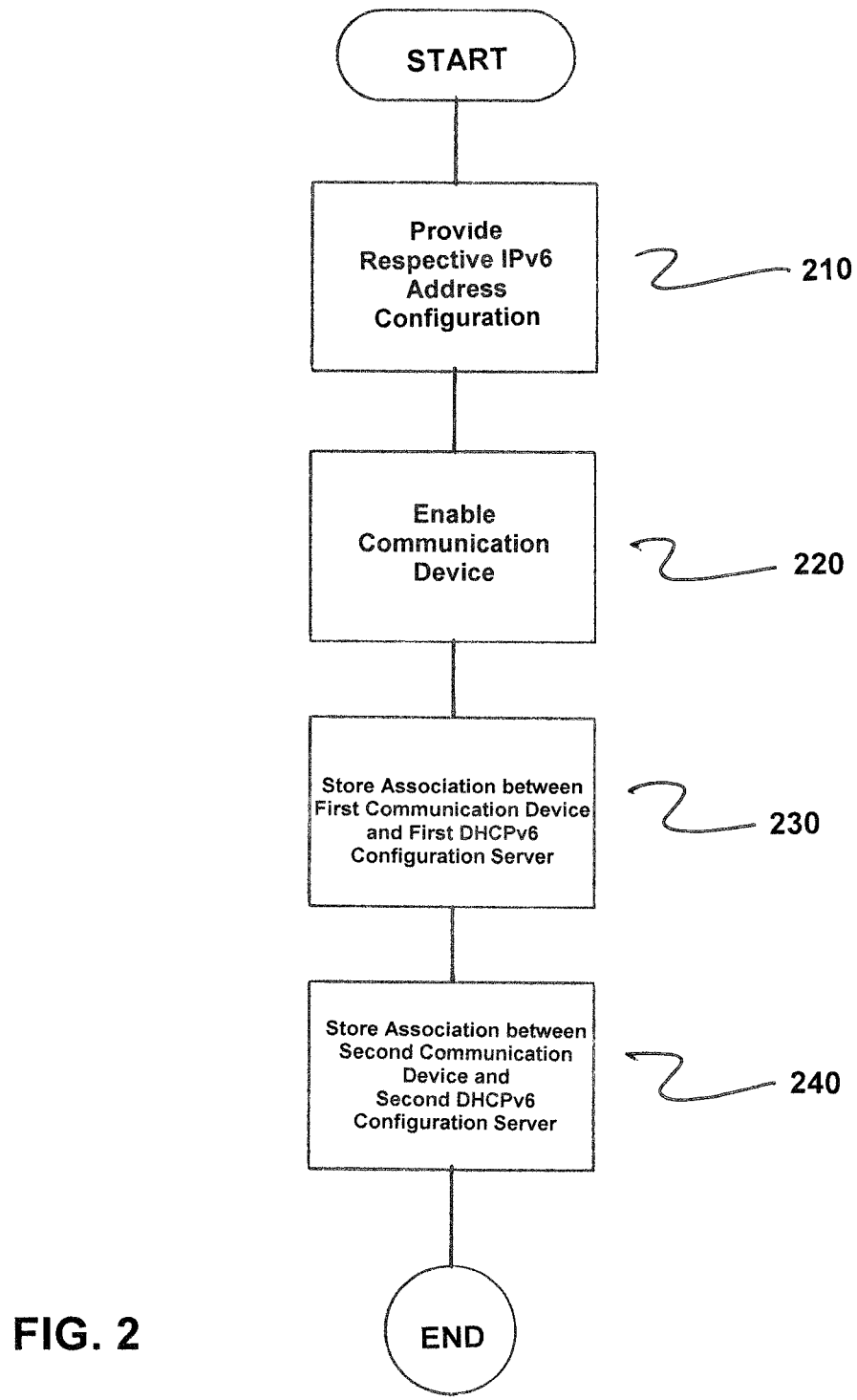
FIG. 2 is a flowchart of the method in accordance with the invention.

FIG. 2 is a flowchart of a method for configuring communication devices in an industrial automation system. The method comprises providing, by a first Dynamic Host Configuration Protocol (DHCPv6) for Internet Protocol Version 6 (IPv6) (DHCPv6) configuration server 101, a respective IPv6 address configuration to a communication device to be configured in response to first DHCPv6 configuration requests having one of (i) an IA_NA option for providing a non-temporary IPv6 address and (ii) an IA_TA option for providing a temporary IPv6 address, as indicated in step 210.

Next, at least one respective IPv6 prefix disseminable via router notification messages for a communication device to be configured which has a router function to respond to second DHCPv6 configuration requests with an IA-PD option for a prefix delegation is enabled by a second DHCPv6 configuration server 102, as indicated in step 220.

Next, an association between the first communication device and the first DHCPv6 configuration server for a prescribable validity period and takes the stored association as a basis for forwarding is stored by a configuration data distribution unit 131 associated with the industrial automation system, during the prescribable validity period, all DHCPv6 configuration requests from the first communication device to the first DHCPv6 configuration server upon receiving a first DHCPv6 configuration request having an IA_NA or IA_TA option from a first communication device 104 in the industrial automation system, as indicated in step 230.

Next, an association between the second communication device and the second DHCPv6 configuration server for a prescribable validity period is stored by the configuration data distribution unit 131 and the stored association is taken as a basis for forwarding, during the validity period, all DHCPv6 configuration requests from the second communication device to the second DHCPv6 configuration server upon receiving a second DHCPv6 configuration request having an IA_PD option from a second communication device 105, associated with the industrial automation system, having a router function, as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring communication devices in an industrial automation system which implements realtime communication protocols comprising one of PROFINET and PROFIBUS for communication between automation devices in an industrial communication network, comprising:
   providing, by a first Dynamic Host Configuration Protocol (DHCPv6) for Internet Protocol Version 6 (IPv6) (DHCPv6) configuration server, a respective IPv6 address configuration to a first communication device without a router function to be configured in response to first DHCPv6 configuration requests having one of (i) an IA_NA option for providing a non-temporary IPv6 address and (ii) an IA_TA option for providing a temporary IPv6 address;
   enabling, by a second DHCPv6 configuration server, at least one respective IPv6 prefix disseminable via router notification messages for a second communication device to be configured which has a router function to respond to second DHCPv6 configuration requests with an IA-PD option for a prefix delegation;
   storing, by a configuration data distribution unit associated with the industrial automation system which implements the realtime communication protocols comprising one of PROFINET and PROFIBUS for the communication between the automation devices in the industrial communication network, an association between the first communication device without a router function and the first DHCPv6 configuration server for a prescribable validity period and taking the stored association as a basis for forwarding, during the prescribable validity period, all DHCPv6 configuration requests from the first communication device to the first DHCPv6 configuration server upon receiving a first DHCPv6 configuration request having an IA_NA or IA_TA option from the first communication device without a router function in the industrial automation system; and
   storing, by the configuration data distribution unit, an association between the second communication device having the router function and the second DHCPv6 configuration server for a prescribable validity period and taking the stored association as a basis for forwarding, during the validity period, all DHCPv6 configuration requests from the second communication device having the router function to the second DHCPv6 configuration server upon receiving a second DHCPv6 configuration request having an IA_PD option from the second communication device having the router function, associated with the industrial automation system;
   wherein the configuration data distribution unit allows for separate operative responsibilities for configuration of the first communication device without the router function and for the second communication device with the router function; and
   wherein the configuration data distribution unit responds to a DHCPv6 configuration request from a communication device by storing an association of this communication device with the first and second DHCPv6 configuration servers if this DHCPv6 configuration request comprises both an IA_NA or IA_TA option and an IA_PD option.

2. The method as claimed in claim 1, wherein the configuration data distribution unit, after expiry of the prescribable validity period for the association between a communication device and a DHCPv6 configuration server, takes a DHCPv6 configuration request received after expiry of the validity period as a basis for ascertaining and storing an updated association between the respective communication device and the respective DHCPv6 configuration server.

3. The method as claimed in claim 1, wherein the validity period for the association between a communication device and a DHCPv6 configuration server is prescribed by configuration.

4. The method as claimed in claim 1, wherein the association between a communication device and a DHCPv6 configuration server is formed by an association between a device identifier of the respective communication device and one of (i) an IPv6 address and (ii) a Domain Name System (DNS) name of the respective configuration server.

5. The method as claimed in claim 4, wherein the device identifier is a DHCP unique identifier.

6. The method as claimed in claim 1, wherein the configuration data distribution unit erases an association between a communication device and a DHCPv6 configuration server if the configuration data distribution unit receives a DHCPv6 RELEASE message from this communication device.

7. The method as claimed in claim 1, wherein the configuration data distribution unit erases an association between the second communication device having the router function and the second DHCPv6 configuration server if a lease period for an IPv6 prefix enabled for the second communication device having the router function by the second DHCPv6 configuration server has expired.

8. The method as claimed in claim 1, wherein the first DHCPv6 configuration server stores information about IPv6 address configurations allocated to communication devices for management of IPv6 address configurations.

9. A configuration data distribution unit for an industrial automation system which implements realtime communication protocols comprising one of PROFINET and PROFIBUS for communication between automation devices in an industrial communication network, comprising:
   a processor; and
   memory;
   wherein the configuration data distribution unit is configured to store an association between a first communication device without a router function and a first DHCPv6 configuration server for a prescribable validity period and to take the stored association as a basis for forwarding, during the validity period, all DHCPv6 configuration requests from the first communication device without the router function to the first DHCPv6 configuration server upon receiving a first DHCPv6 configuration request having one of (i) an IA_NA option for providing a non-temporary IPv6 address and (ii) an IA_TA option for providing a temporary IPv6 address from the first communication device associated with the industrial automation system which implements the realtime communication protocols comprising one of PROFINET and PROFIBUS for communication between automation devices in the industrial communication network;

wherein the first DHCPv6 configuration server provides an IPv6 address configuration to the first communication device without the router function to be configured;

wherein the configuration data distribution unit is configured to store an association between a second communication device having a router function and a second DHCPv6 configuration server for a prescribable validity period and to take the stored association as a basis for forwarding, during the validity period, all DHCPv6 configuration requests from the second communication device having the router function to the second DHCPv6 configuration server upon receiving a second DHCPv6 configuration request having an IA_PD option from the second communication device having the router function;

wherein the second DHCPv6 configuration server enables at least one IPv6 prefix for dissemination via router notification messages by a second communication device to be configured which has the router function;

wherein the configuration data distribution unit allows for separate operative responsibilities for configuration of the first communication device without the router function and for the second communication device with the router function; and wherein the configuration data distribution unit is configured to respond to a DHCPv6 configuration request from a communication device by storing an association of this communication device with the first and second DHCPv6 configuration servers if this DHCPv6 configuration request comprises both an IA_NA or IA_TA option and an IA_PD option.

* * * * *